United States Patent [19]

Dunlop et al.

[11] 3,994,848

[45] Nov. 30, 1976

[54] SOLID PAINTS

[75] Inventors: Alfred Norman Dunlop, Toronto; Christopher Grant Rickard, Mississauga, both of Canada

[73] Assignee: SCM (Canada) Limited, Don Mills, Canada

[22] Filed: Dec. 20, 1974

[21] Appl. No.: 534,826

[52] U.S. Cl. .................. 260/29.2 E; 260/29.2 EP; 260/29.2 UA; 260/29.6 TA; 260/29.6 SQ; 260/29.6 M; 260/29.6 MM; 260/29.6 PM; 260/29.6 AB; 260/29.6 MH; 260/29.6 N; 260/29.6 CM; 260/29.6 ME; 260/32.6 R; 260/33.4 R; 260/33.6 UA; 106/109

[51] Int. Cl.$^2$.......................... C08J 3/06; C08J 3/08

[58] Field of Search ......... 260/22 T, 22 A, 29.2 EP, 260/29.2 E, 29.2 UA, 33.4 R, 33.6 UA, 29.6 TA, 29.6 SQ, 29.6 M, 29.6 MM, 29.6 PM, 29.6 AB, 29.6 MH, 29.6 N, 29.6 CM, 29.6 ME, 32.6 R; 106/19

[56] References Cited

UNITED STATES PATENTS

| | | | |
|---|---|---|---|
| 2,462,018 | 2/1949 | Wood | 106/19 |
| 2,987,493 | 6/1961 | Grady et al. | 260/884 |
| 3,110,690 | 11/1963 | Friedsam | 260/22 T |
| 3,365,520 | 1/1968 | Foster et al. | 260/897 |
| 3,505,268 | 4/1970 | Backhouse et al. | 260/34.2 |

*Primary Examiner*—J. Ziegler
*Attorney, Agent, or Firm*—Merton H. Douthitt; A. Joseph Gibbons

[57] ABSTRACT

Solid paint compositions having dimensional stability based on ion bonding of discrete particles are obtained by reacting stabilized non-aqueous dispersions of certain resins having acid group functionality with a substantial excess in the order of 100 – 500 mole percent of a cross-linking reactant formed by solution of a metal hydroxide, ammonium hydroxide or cation former in a polar solvent of dielectric strength greater than 10.

13 Claims, No Drawings

SOLID PAINTS

BACKGROUND OF THE INVENTION

The present invention relates to a new type of paint product, namely, a solid paint having dimensional stability based on ion particle bonding.

Various resin compositions consisting of homopolymers and copolymers having partially neutralized carboxylic acid groups are known. These contain between 3% and 20% of carboxylic acid residues of which less than 50 percent of the carboxylic acid groups are neutralized with monovalent, divalent or trivalent cations. The prior art resins, known as Ionomers, are desirable in industry because they combine the utility of a thermoset polymer with the mobility and workability of the thermoplastic resin. Ionomers have lower densities than vinyl or cellulosic plastics and because of their similarity to polyethylenes find use as protective films in the food packaging industry.

It has now been discovered that solid paints having gel properties sufficient to provide dimensional stability can be prepared by crosslinking certain reactive polymers with "ion clusters" having polar molecule components. This type of ion bonding of discrete particles differs substantially from the solvent-free ionic bonding of the prior art compounds.

BRIEF SUMMARY OF THE INVENTION

One object of the present invention is to provide a solid paint composition having dimensional stability based on ion particle bonding comprising the admixture of:
a. a stabilized dispersion of a polymer having a molecular weight ranging from 25,000 to 1,000,000 and sufficient reactive functional groups selected from the group consisting of carboxylic, sulfonic, and phosphonic to provide an acid number from 25 to 60, said resin suspended in a non-polar non-solvent as a 25 to 90 weight percent suspension; and
b. an ionic cross-linking agent, selected from the group consisting of a metal hydroxide, ammonium hydroxide, or an organic cation former, dissolved in a polar solvent of high dielectric strength to provide a 10–50 weight percent solution or suspension, said metal hydroxide selected from the group consisting of sodium, potassium, lithium, barium, calcium, manganese and magnesium hydroxides;
wherein said composition contains from about 100 to 500 mole percent of ionic cross-linking agent per mole of reactive functional group and has a gel strength from 130 to 200 millimeters penetration.

An additional object is to provide a process for preparing a solid paint having dimensional stability based on ion particle bonding and a gel strength from about 130 to 200 which comprises:
a. suspending a resin in a non-polar non-solvent in the range of 30 to 60 weight percent in the presence of a stabilizer, said resin having a molecular weight of about 25,000 to 1,000,000 and sufficient pendant or terminal reactive acid functionality selected from the group consisting of carboxylic, sulfonic and phosphonic to yield an acid value in the range of 25 to 60;
b. mixing pigments, fillers and colorants into the resin dispersion;
c. adding thereto under vigorous stirring a 20 to 30 weight percent solution of metal hydroxide in a $C_{1-8}$ aliphatic alcohol containing 100 to 500 mole percent of the amount of metal hydroxide needed to neutralize said reactive acid group of the resin;
d. allowing the mixture to age for 3 to 25 hours at a temperature between 15° and 70° C.

A further object is to provide paint sticks or bars formed from the herein described paints and process.

DETAILED DESCRIPTION

Solid paint compositions having dimensional stability and desirable paint characteristics result from the interaction of certain polymers, having reactive functional groups, dispersed in non-polar non-solvent with ionizable cross-linking agents dissolved in polar solvents of high dielectric strength. Cross-linking of the polymer chains takes place through "ion clusters" composed of multiple ions associated with polar solvent molecules.

By the term solid paint is meant a paint which has sufficient dimensional stability under storage conditions, i.e. is self-supporting, yet could be utilized as a stick of paint (analogous to a segment of hard butter or cheese). Such a solid paint can advantageously be applied by hand to the surfaces usually protected by paint and coating products without the use of a brush or roller. For practical and protective purposes, such stick of paint is contained in a skin or covering suitable for application or for storage. Advantageously such protective cover will have a closeable opening, said covering being distinct from the nature of an applicator in the usual sense. The solid paint is used by placing the paint stick in contact with the surface to be painted followed by the usual vertical and lateral movements across the substrate whereby a non-sagging, air-curable paint film is deposited thereon. The shear provided by drawing the paint stick over the surface to be painted is sufficient to cause the solid paint to deform to a flowable coating at the point of contact. Such a solid paint coating is one that possesses the desirable properties of adhesion, flow and uniform coverage of the surface. It is assumed that the solid paint of the present invention will contain the usual pigments, fillers, driers, bonding agents, and other additives to provide films having desirable properties of gloss, color, and hiding power. It is anticipated that such a solid paint could be fabricated in blocks or sticks having widths ranging from ⅛ inch to about 8 feet or larger, thus, also allowing use in industrial application such as, for example, coil coating of metal.

The resins useful in the present invention include homopolymers and copolymers and mixtures thereof having appropriate functional groups either built into the polymer chain or grafted thereto by the usual graft techniques. Useful resin include but are not limited to polyethers, unsaturated polyesters, polyurethanes, polyacrylates, vinyl resin and chlorine-substituted vinyls as well as other combinations known to the art. The particular reactants and quantities are chosen to produce a resin having pendant functional substituents which are capable of further reactions with ionic reagents to form gels of proper dimensional stability and gel strength. Desirable application properties result when the gel strength is from about 130 to 210 and preferably from 150 to 195 mm. when measured 25 hours after gelling. Gel strength is recorded in millimeter units using a Universal penetrometer-the lower the penetrometer reading, the higher the gel strength.

Regardless of the type of resin used in the practice of this invention, it is essential that the particular resin be insoluble or only lightly swelled by the non-solvent, as is necessary for any non-aqueous dispersion, and that the resin have pendant reactive groups which are readily ionizable. Such ionizable groups include both cationic and anionic reactive functions. Preferably, anionic functional groups used to modify the resin are the sulfonic, phosphonic, and carboxylic types. The carboxylic acid functionality is especially preferred since a variety of polymers having such reactive ionizable groups can be readily purchased or synthesized. Preferred resins are copolymers of unsaturated hydrocarbons and unsaturated acids having molecular weights in the range of 100,000 to 300,000. Especially useful resins for the practice of this invention are acrylic acid esters and vinyl polymers having a particle size range of from 0.01 to 30 microns. Acrylate and methacrylate copolymers having terminal carboyxlic functionality are especially preferred and are illustrated in the best mode examples. Non-aqueous dispersions (NADs) known to the art and particularly useful in the practice of this invention (if these are modified to have ionizable sites on the surface) include those described by Dowbenko and Hart, *Ind. Eng. Chem. Prod. Res. Develop.*, Vol. 12, No. 1, 1973 at pages 14–28. The polymers and stabilizers described therein are hereby incorporated by reference. In the formation of such NADs the choice and level of stabilizer is eminently important to provide solid paints having desirable application flow and coalescence characteristics. Other useful NAD resin include those derived from poly (methyl methacrylate), polyacrylate and polymethacrylate resin and copolymers of these derived through addition polymerization with polyolefins, such as polyethylene, poly (vinyl ethyl ether), vinyl acetate, hydroxyethyl acrylate and 2-hydroxypropyl methacrylate.

The polymer resins useful in the practice of this invention can be prepared by solution polymerization followed by dispersion in a non-solvent or by dispersion polymerization. The first method involves polymerizing the monomer or comonomers and other intermediates under free radical conditions at a temperature of about −50° to +250° F. to yield a resin having an acid value (AV) ranging from 20 to 80 and preferably from 25 to 60. The second and preferred method involves polymerizing the monomer or comonomers and other intermediates in a non-solvent under free radical conditions at a temperature of about −50° to +250° F. to yield a resin dispersion with the desirable acid value.

The above described polymers having ionizable reactive groups are dispersed in a non-polar non-solvent to provide a dispersion having nonvolatile (N/V) content of from about 10 to 90 and preferably from 30 to 60 weight percent. Especially preferred are dispersions of 50% N/V. Suitable non-solvents include both aromatic and aliphatic type hydrocarbons which are selected based on the particular resin, the functionality on said resin and the nature of the ionic reactant. In general suitable non-solvents are hydrocarbons having a boiling point of about 100° to 400° F. and which contain up to twelve carbon atoms. These include hexane, heptane, octane, nonane, decane, dodecane and mixtures thereof. Preferred hydrocarbons are the various octanes because of their suitable evaporation rates. Mineral spirits is an especially preferred solvent because of its availability and the desirable properties of the resultant solid paint. For some resin systems aromatic hydrocarbons such as toluene or xylene may be used.

It is recognized that NAD resins can be suitably formulated with various stabilizers known to the art. The function of these stabilizers is primarily to prevent the resin particle from coalescing on storage and during formulation into solid paint products. Useful stabilizers include those described and referenced in the above noted article by Dowbenko and Hart. Polyene stabilizers which are useful for certain solid paint compositions include low molecular weight polybutadiene, grafted to a backbone of an acrylic copolymer. For the instant solid paints NAD resin stabilized by copolymers of methyl methacrylate and glycidyl methacrylate and further reacted with 12-hydroxystearic acid and/or poly (lauryl methacrylate) are especially preferred.

It is understood that the non-solvent, resin and proportions of each will vary and depend on the type of resins, stabilizers, non-solvent, fillers, and other additives needed for a particular end-product solid paint. The additives, driers and other usual dispersant aids are preferably blended with the resin dispersion using a Cowles agitator. The order of addition is usually not critical. The typical solid paint formulations as described herein are of the latex type non-aqueous resin dispersion and do not usually require specific drier components to give suitable film properties; when driers are added they are used in quantities less than 2 percent and preferably less than 1 percent per weight of total composition. The driers are added for the small amount of oil or alkyd that is normally added to the formulation to aid dispersion of the pigment and to aid in the coalescence of the film. After application the resin particles coalesce and fuse to give a dry film in matter of minutes. The above resin formulations (dispersion of polymer in a non-polar non-solvent) are next combined with the ionic crosslinking agents dissolved in a high dielectric polar solvent.

Suitable ionic cross-linking reactants are usually of the inorganic salt variety which produce on solution specific cations or anions capable of combining with the pendant reactive groups on the particle to form ion clusters responsible for gel formation. Such clusters, which contain the high dielectric polar solvent molecules, act as reversible cross-links to join the reactive resin particles in webs thus imparting gel strength and dimensional stability to the resultant solid paint. When the reactive pendant sites on the polymer are carboxylic acid groups (—COOH), the preferred cross-linking reactants are alcoholic solutions of mono, di and trivalent metal hydroxides. Such cross-linking reactants include the oxides and hydroxides of sodium, potassium, lithium, barium, calcium, manganese and magnesium; equally effective cross-linking agents are the corresponding metal alkoxides i.e. sodium methylate. In some cases, ammonium hydroxide and organic cation formers such as tetramethylammonium hydroxide can be used as cross-linking reactants. The cross-linking gellation derived by reacting sodium hydroxide with non-aqueous dispersion particles (NAD) having pendant carboxylic acid group is especially preferred. Suitable gels result when an effective amount of the cationic base combines with the free carboxylic acid functionality. In every case an amount of base substantially in excess of the amount required for neutralization is necessary to be effective. By substantial excess is meant from about 100–500 mole percent of ionic reactant dissolved in the polar solvent. Although the amount of excess varies with each particular resin system and depends upon the resin particle size, the number and type of the ionizable functional group and on the valence of the metal hydroxide, satisfactory gels result when the ionic reagent is used at 100-500 mole percent. When amounts less than 100 mole percent are used the resins do not exhibit the required dimensional stability. When amounts greater than 500 mole percent are used the resins do not exhibit the desired flow and surface characteristic. For gel formation, the hydroxides or other cross-linking reactants are added as a 10-50 weight percent solution in the polar solvent to the polymer resin dispersed in the non-polar non-solvent. Preferred solid paints were obtained by using 100 to 300 mol percent sodium hydroxide based on the molar content of the reactive functional group, i.e., moles free COOH.

The polar high dielectric solvents useful in dissolving the ionic cross-linking agents are generally those solvents having a dielectric constant greater than 10 and include aliphatic alcohols containing one to ten carbon atoms and one to two hydroxy groups. Although $C_{1-8}$ aliphatic alcohols are usually preferred, glycols containing the similar carbon chains are sometimes useful in producing desirable gel properties in the resultant solid paint. Useful alcohols include methanol, ethanol, isopropanol, n-propanol, the normal and isomeric butanols, pentanols, hexanols, heptanols, octanols, as well as the corresponding glycols derived therefrom. Methanol is the preferred alcohol because of its costs, availability, and the favorable solubility of the ionic reagents therein. In certain applications it is preferred to use glycols or mixtures of glycols and alcohols as the plasticizer carrier for the ionic reactant. Preferred glycols are ethylene glycol and propylene glycol although for certain resins the higher glycols such as pentanediol and hexanediol act in the nature of a plasticizer and provide desirable lubricity. Additional high dielectric polar solvents useful in the practice of this invention include, water, formamide, dimethylformamide, and dimethylsulfoxide.

A further aspect of this invention includes the use of resins having pendant and/or terminal functional reactive groups other than the acid or carboxylate group. When the ionizable group on the polymer is a cationic precursor instead of an acid group, the ionic cross-linking reactant will be an anion precursor. Examples of cation formers are (1) primary, secondary, tertiary and cyclic amines which react with hydrogen and organic halides to give quaternary salts (2) substituted phosphines which combine with halides to give phosphonium salt (3) sulfides which react with alkyl halides give sulfonium salts and (4) cyclic ethers which with acids give oxonium salts. Examples of anion source cross-linking agents include acetic acid, nitric acid, hydrochloric acid, sulfuric acid, and relatively short chain organic multibasic acids such as oxalic, malic, succinic, maleic, adipic acids and corresponding anhydrides.

The following specific examples illustrate only a limited number of embodiments; accordingly, the invention is not limited thereto. All parts and percentages being by weight unless otherwise indicated. The "mineral spirits" used had a boiling range of 300°–400° F. and the 'odorless mineral spirits' had a boiling range at 345°–410° F. Molecular weights reported are viscosity average molecular weights unless otherwise specified.

PREPARATION OF NAD RESINS

The NAD resins, 1, 2, 2A, 3 and 4 were prepared by addition polymerization of various monomers in the presence of non-solvents, free radical initiators and various stabilizers in the relative proportions shown in Table I. A small portion of the monomers is charged to the polymerization kettle with the nonsolvent and about 50 percent of the desired stabilizer and polymerization is initiated by heating to a reflux temperature in the order of 70°–80° C. Thereafter the remaining monomers, stabilizer (30%) and free radical initiator are added with ethyl acetate in one feed stream while the acidic component i.e. methacrylic acid and remaining stabilizer (20%) is added in a separate feed stream over a two to three hour addition period at the reflux temperature. Additional initiator (¼ total amount) is introduced in ethyl acetate in two portions over a further reaction period of 2 hours. After refluxing for an additional two hours, low boiling solvent is removed by heating to approximately 90° C. For this present invention it is important that the NAD be prepared with the carboxylic sites (or other ionizable sites) at the surface of the particle (or at least the majority be available to the surface) in order to provide the external acid sites on the suspended polymer particles. In this case the acid feed was started 10 minutes after the other monomer feed was commenced; and the acid feed was completed approximately 10 minutes after the other monomer feed was terminated.

Variants of the conditions shown in this example may be used as long as a stable NAD is produced where the acid sites are available for gelling and not buried in the body of the particle. It is recommended that an acid value determination be made on the NAD.

TABLE 1

| GENERAL MAKEUP OF NAD POLYMERS (PARTS BY WEIGHTS) | | | | | |
|---|---|---|---|---|---|
| | NAD-1 | NAD-2 | NAD-2A | NAD-3 | NAD-4 |
| Vinyl Acetate | 227 | 142 | 142 | 142 | 142 |
| Ethyl Acrylate | 104 | 212 | 237 | 237 | 212 |
| NAD Stabilizer | 76.4 | 76 | 76 | 57.5 | 58 |
| Methacrylic Acid | 28 | 26 | 38 | 30 | 18 |
| Mineral Spirits | 300 | 300 | 300 | 300 | 300 |
| Hexane | 300 | 300 | 300 | 300 | 300 |
| Azobisisobutyronitrile | 7.5 | 7.5 | 7.5 | 7.5 | 6 |
| Ethylacetate | 25 | 25 | 25 | 25 | 25 |
| Non-Volatile Content (final) | 42.4 | 47.5 | 49 | 49.8 | 58.1 |
| Acid Value NAD | 44.7 | 39.5 | 55.5 | 43.7 | 28.5 |

PREPARATION OF NAD STABILIZER 1000 parts 12-hydroxystearic acid, 3.5 parts tetraisopropyl titananate and 60 parts xylene were heated together at 200° C under a nitrogen atmosphere. The reaction was monitored by collecting the by-product water. The resulting product had an acid value of 34.2 (calculated 33). This product was further reacted at 90° C under nitrogen with 82.3 parts glycidyl methacrylate using 400 parts methyl ethyl ketone and 10 parts triethylamine to yield a second intermediate having an acid value of 4.3 and a non-volatile content of 93.4. (The methyl ethyl ketone is stripped off at the end of the reaction). This second intermediate (321 parts) was polymerized under free radical conditions with 225 parts methyl methacrylate in the presence of ethyl acetate (500 parts), dodecyl mercaptan (1.5 parts) and azobisisobutyronitrile (3.0 parts) free-radical initiator. The stabilizer was obtained in 98 percent yield.

PREPARATION OF ALKYD MODIFIER

A polyester alkyd condensation polymer was prepared by condensing 136 parts pentaerythritol, 560 parts dehydrated castor oil fatty acid, 135 parts Azelaic 1110 dimer acid, and 168 parts Empol 1014 dimer acid in a fusion cook at 460° F. to produce an alkyd resin have reactive carboxylic acid functionality, acid value of 41, and a molecular weight of 1500.

EXAMPLE I

Resin NAD-2 (87 parts of 50 N/V suspension in mineral spirits) was formulated and blended to a No. 6 Hegman grind with 30 parts of alkyd modifier and 120 parts titanium dioxide. No driers were used in the formulation. In a similar fashion resin NAD-2A (94 parts of 50 N/V in mineral spirits) was blended with 25 parts alkyd modifier and 115 parts titanium dioxide. Various weights of sodium hydroxide (25% solution in methanol) were then added to form the solid paints identified in Table II as Experiment IA, and IB. Solid paints IA and IB with respective gel strengths of 164 and 185 exhibited dimensional stability, had good application characteristics and gave a satisfactory dry coating on application to a test panel. By good application characteristics it is implied that on drawing the paint across the test panel a uniform film of paint is transferred to the panel and the work required to accomplish this is not excessive.

In a third paint, resin NAD-2 (94 parts of 50 N/V in mineral spirits) was blended with 25 parts alkyd modifier, 115 parts titanium dioxide, 0.5 parts cobalt drier (12 percent cobalt), 0.5 parts manganese drier (8 percent metal), 4.0 parts zirconium drier (12 percent metal); the driers are added for the alkyd modifier. 16.1 parts sodium hydroxide (25% solution in methanol) were then added to form the solid paint identified in Table II as experiment IC. This product exhibited dimensional stability, had good application characteristics and exhibited an excellent dry on application to a test panel.

TABLE II

| Exp No. | Resin | Parts NaOH Added | Percent Neutralization Calculated on Moles Carboxylic Acid | Gel Strength* (24 hours) |
|---|---|---|---|---|
| IA | NAD-2 | 15.8 | 175 | 164 |
| IB | NAD-2A | 16.1 | 175 | 185 |
| IC | NAD-2A | 16.1 | 175 | 183 |
| IIA | NAD-1 | 12.8 | 200 | 135 |
| IIB | NAD-1 | 12.8 | 200 | 195 |
| IIC | NAD-1 | 12.8 | 200 | 221 |
| IIIA | NAD-2 | 11.2 | 200 | 240 |
| IIIB | NAD-2 | 14.0 | 250 | 190 |
| IVA | NAD-3 | 14.0 | 225 | 150 |
| IVB | NAD-3 | 16.2 | 225 | 200 |
| VIA | NAD-2 | 15.3 | 175 | 160 |

* Average of three readings

EXAMPLE II

Resin NAD-1 (110 parts) was formulated and blended to a No. 6 Hegman grind with 100 parts titanium dioxide, 0.015 parts cobalt drier (12% cobalt), 0.10 parts zirconium drier (12% zirconium) in three formulations A, B and C containing 5, 10 and 15 parts of tall oil alkyd (100% solids) respectively. Various weights of sodium hydroxide were then added as a 25 weight percent solution in methyl alcohol to form the solid paints identified in Table II as Experiment IIA, IIB and IIC. Solid paints IIA and IIB with gel strengths of 135 and 195 respectively exhibited satisfactory application characteristics. Solid paint IIC exhibited poor application characteristics. All three solid paints exhibited dimensional stability and gave a satisfactory dry coating on application to a test panel.

EXAMPLE III

Resin NAD-2 (105 parts) was formulated and blended to a No. 6 Hegman grind with 100 parts titanium dioxide, 0.015 parts cobalt drier (12% cobalt), 0.10 parts zirconium drier (12% zirconium) and 10 parts tall oil alkyd (100%). Various weights of sodium hydroxide were added as a 25 weight percent solution in methyl alcohol to form the solid paints identified in Table II as Experiments IIIA and IIIB. Solid paint IIIA with a gel strength of 240 had inferior application characteristics (too soft, heavy drag) as opposed to the good characteristics of solid paint IIIB having a gel strength of 190. Although the paints exhibited dimensional stability the film appearance was poor due to unsatisfactory coalescence.

EXAMPLE IV

Resin NAD-3 (101 parts) was formulated as indicated for NAD-2 in Example III above using 10 parts tall oil in one case and replacing the tall oil with 15 parts of the polyester alkyd modifier in the second case. The corresponding solid paints prepared by the addition of a 25 weight percent solution of sodium hydroxide in methanol are identified in Table II as solid paints IVA and IVB respectively. Solid paints IVA and IVB with gel strengths of 150 and 200 exhibited dimensional stability and satisfactory application and film characteristics.

EXAMPLE V

Paint blocks of approximate size 4 × 6 inches formed from the above described solid paints were stored using a thin polyethylene envelope for a period of nine months. Application of these paints to a test panel after the storage period showed no detectable deterioration of the application and film characteristics. Additionally solid paints prepared from the same resins but having acid values in the range of from 25 to 60 gave acceptable solid paint characteristics. The best application properties were obtained when the gel strength as measured by the Universal penetrometer was between 130 and 195mm. although formulations having gel strength of from 100–130 and 195–200 gave effective solid paints with somewhat less desirable characteristics.

EXAMPLE VI

Resin NAD-4 (94 parts of 50 N/V suspension in mineral spirits) was formulated and blended to a No. 6 Hegman grind with 30 parts of alkyd modifier, 100 parts titanium dioxide, 15 parts calcium carbonate, 0.65 parts cobalt drier (12 percent cobalt), 0.65 parts manganese drier (8 percent metal), and 6.0 parts zirconium drier (12 percent zirconium). Sodium hydroxide (25% solution in methanol) was then added to form the solid paint identified in Table II as experiment VIA. This solid paint had good application characteristics, exhibited dimensional stability and gave a dry film on a test panel.

EXAMPLE VII

A non-aqueous dispersion was prepared without using added stabilizer. A monomer system was chosen so that it would be partially swelled in the nonpolar solvent, this being enough to maintain stability of the dispersion.

In this case, 780 parts butyl acrylate, 100 parts methacrylic acid, 8 parts dodecyl mercaptan, 12 parts azobisisobutyronitrile, and 600 parts mineral spirits were charged to a reactor. The charge was brought to and held at 80° C. for 5 hours. Conversion was 97%, the acid value of the dispersion was 43.7. The theoretical acid value is 72, i.e. a certain amount of the acid is buried when this method of preparation is used.

Two aliquots each of 180 parts (60 percent N/V resin) were mixed with 25.0 parts (200% neutralization) and 37.5 parts (300% neutralization) of sodium hydroxide as a 25 percent solution in methanol. Both products exhibited dimensional stability; however, the application characteristics were poor.

This product is not a true NAD and could best be described as a very coarse dispersion. This does point out, however, the possibility of internal stabilization through a judicious choice of monomers. This system is not as stable and many of the ionizable sites are buried.

What is claimed is:

1. A solid paint composition having dimensional stability based on ion particle bonding comprising the admixture of:
   a. a stabilized dispersion of a polymer having a molecular weight ranging from 25,000 to 1,000,000 and sufficient reactive acid functional groups selected from the group consisting of carboxylic, sulfonic, and phosphonic to provide an acid number from 25 to 60, said polymer dispersed as a 25 to 90 weight percent suspension in a non-polar non-solvent; and
   b. an ionic cross-linking agent selected from the group consisting of metal hydroxide, ammonium hydroxide, or an organic cation former dissolved in a polar solvent of dielectric strength greater than 10 to provide a 10–50 weight percent solution or suspension;
   wherein said composition contains in excess of, from 100 to 500 mole percent, the amount of cross-linking agent needed to neutralize said reactive acid group of the polymer and has a gel strength from 130 to 200.

2. The composition of claim 1 wherein the cross-linking agent is a metal hydroxide selected from the group consisting of sodium, potassium, lithium, barium, calcium, manganese and magnesium hydroxides.

3. The composition of claim 2 wherein the polar solvent is selected from the group consisting of a $C_{1-8}$ aliphatic alcohol, formamide and water, the metal hydroxide, is sodium hydroxide and the functional group is a carboxylic acid group.

4. The composition of claim 3 wherein the polar solvent is methanol and the cross-linking agent is sodium hydroxide.

5. The composition of claim 4 wherein the resin is a vinyl acetate-ethylacrylate-methacrylic acid terpolymer.

6. The composition of claim 5 wherein the resin dispersion is stabilized with copolymer formed from methyl methacrylate and reaction product of glycidyl methacrylate and poly (12-hydroxystearic acid).

7. The composition of claim 5 wherein the resin having a molecular weight of 100,000 to 300,000 and acid number 30–40 is suspended in mineral spirits and the sodium hydroxide is present at 220–280 mole percent.

8. A process for preparing a solid paint having dimensional stability based on ion particle bonding and a gel strength from about 130 to 200 which comprises:
   a. suspending a resin in a non-polar non-solvent in the range of 30 to 60 weight percent in the presence of a stabilizer, said resin having a molecular weight of 25,000 to 1,000,000 and sufficient pendant or terminal reactive acid functionality selected from the group consisting of carboxylic, sulfonic and phosphonic to yield an acid value in the range of 25 to 60;
   b. mixing pigments, fillers, colorants into the resin dispersion;
   c. adding thereto under vigorous stirring a 20 to 30 weight percent solution of metal hydroxide, ammonium hydroxide or organic cation former in a $C_{1-8}$ aliphatic alcohol containing in excess of, from 100 to 600 mole percent, of the amount needed to neutralize said reactive acid group of the resin, said metal hydroxide selected from the group consisting of sodium, potassium, lithium, barium, calcium, manganese and magnesium.
   d. allowing the mixture to age for 3 to 25 hours at a temperature between 15° and 70° C.

9. The process of claim 8 wherein the resin is a homopolymer or copolymer selected from the group consisting polyester, unsaturated polyester, polyvinylchloride, polymethacrylate, polyacrylate, or mixtures thereof, wherein said reactive acid group is a carboxylic acid group present in amounts from about 1 to 4 per 2,000 units of molecular weight.

10. The process of claim 8 wherein 210–250 mole percent of a 25 weight percent solution of sodium hydroxide in methanol is combined with a vinyl acetate-ethyl acrylate methacrylic acid terpolymer resin.

11. The process of claim 10 wherein the resin has a molecular weight of 100,000 to 300,000 and an acid number of from 25 to 80.

12. A solid paint prepared according to claim 11.

13. A paint stick which comprises the solid paint of claim 12 encased in a removable skin.

* * * * *

UNITED STATES PATENT AND TRADEMARK OFFICE
CERTIFICATE OF CORRECTION

PATENT NO. : 3,994,848
DATED : November 30, 1976
INVENTOR(S) : Alfred Norman Dunlop and Christopher Grant Rickard It is certified that error appears in the above-identified patent and that said Letters Patent are hereby corrected as shown below:

Column 1, lines 14 and 17: Change "lonomers" to read --Ionomers--.

Column 2, line 6: Insert --solid-- between "described" and "paints".

Corrections under Rule 323:

Column 7, line 38: Before the word "reactive" change "have" to read --having--.

Claim 3, Column 10, line 14: Delete "," appearing before the phrase "is sodium hydroxide".

Claim 9, Column 10, line 54: Insert --of-- between "ing" and "polyester".

Signed and Sealed this

Twenty-ninth Day of March 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,994,848
DATED : November 30, 1976
INVENTOR(S) : Alfred Norman Dunlop & Christopher Grant Rickard It is certified that error appears in the above-identified patent and that said Letters Patent are hereby corrected as shown below:

Delete the word "millimeter(s)" or its abbreviation "mm" at each of the following locations:

Col. 1, line 52: delete the word "millimeters".

Col. 2, line 62: following the number 195 delete "mm".

Col. 2, line 63 bridging line 64: delete the word "millimeter".

Col. 9, line 13: following the number 195 delete "mm.".

*Signed and Sealed this*

*Twenty-eighth* Day of *April 1981*

[SEAL]

*Attest:*

RENE D. TEGTMEYER

*Attesting Officer*    *Acting Commissioner of Patents and Trademarks*